Sept. 12, 1944. R. J. THERIAULT 2,358,190
STORAGE TANK ESPECIALLY TANK TRAILERS
Filed June 3, 1940 6 Sheets-Sheet 1

INVENTOR:
Raymond J. Theriault
John P. Tarbox
ATTORNEY

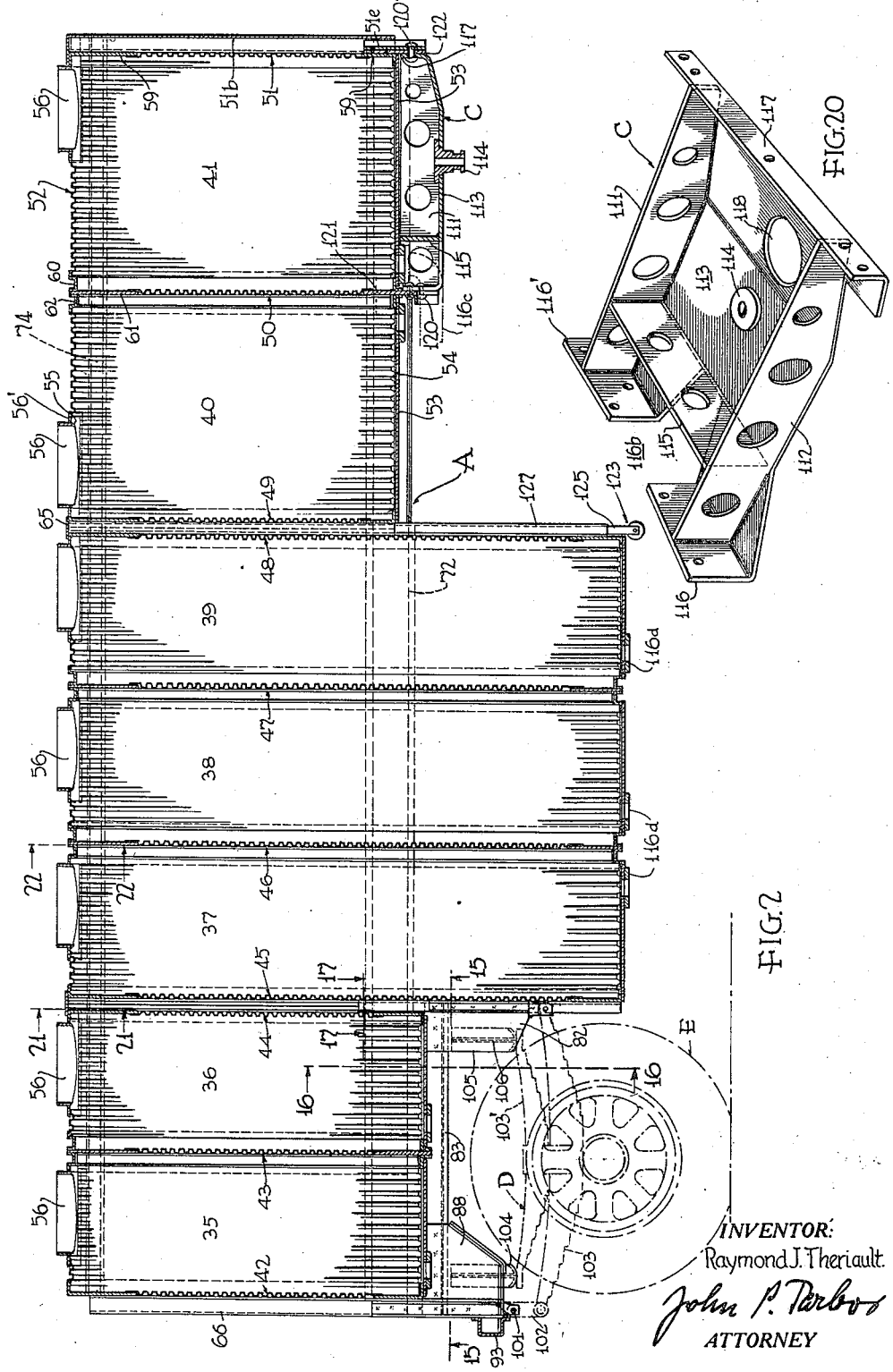

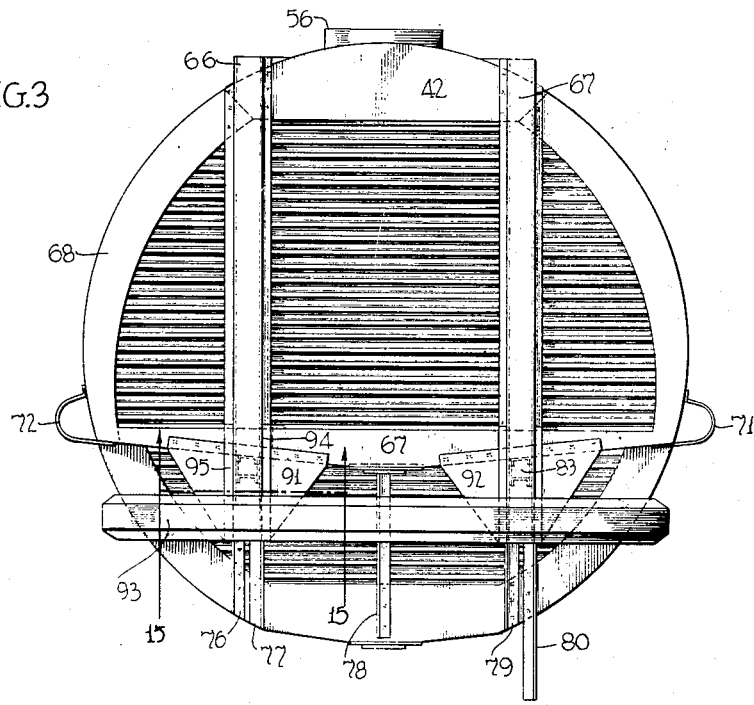
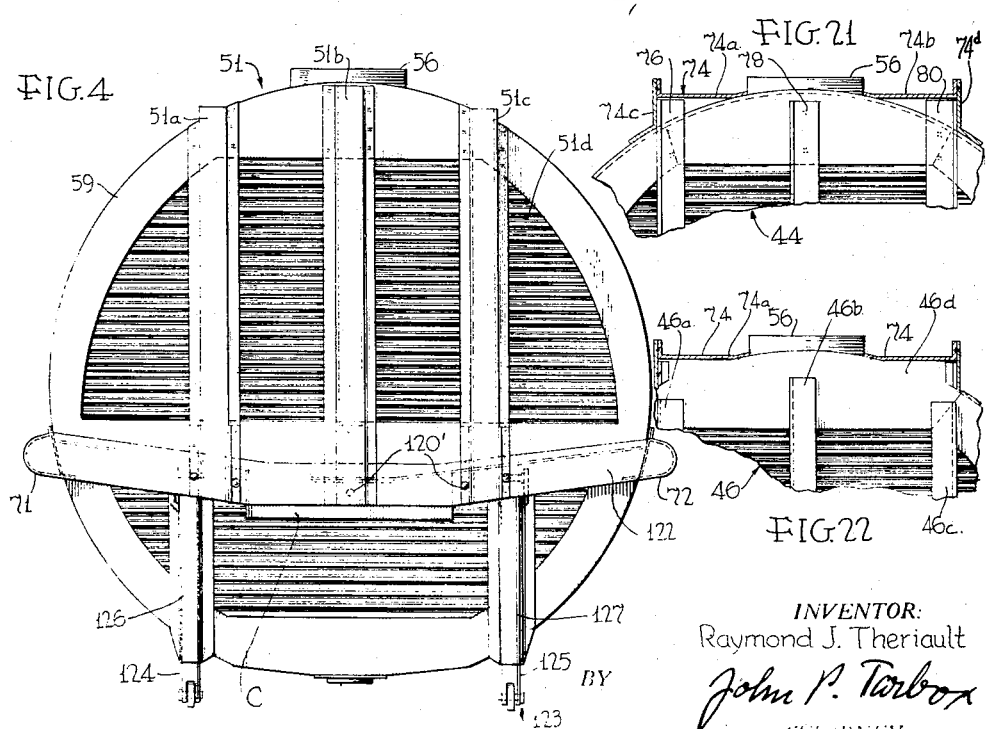

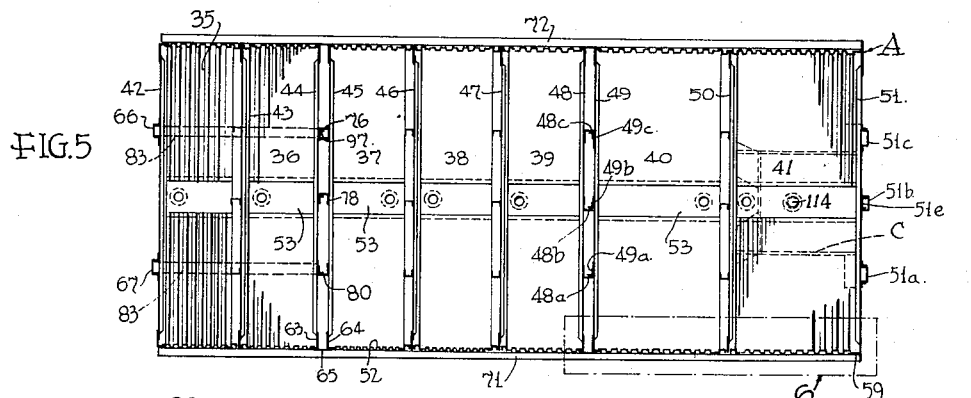

Sept. 12, 1944. R. J. THERIAULT 2,358,190
STORAGE TANK ESPECIALLY TANK TRAILERS
Filed June 3, 1940 6 Sheets-Sheet 5
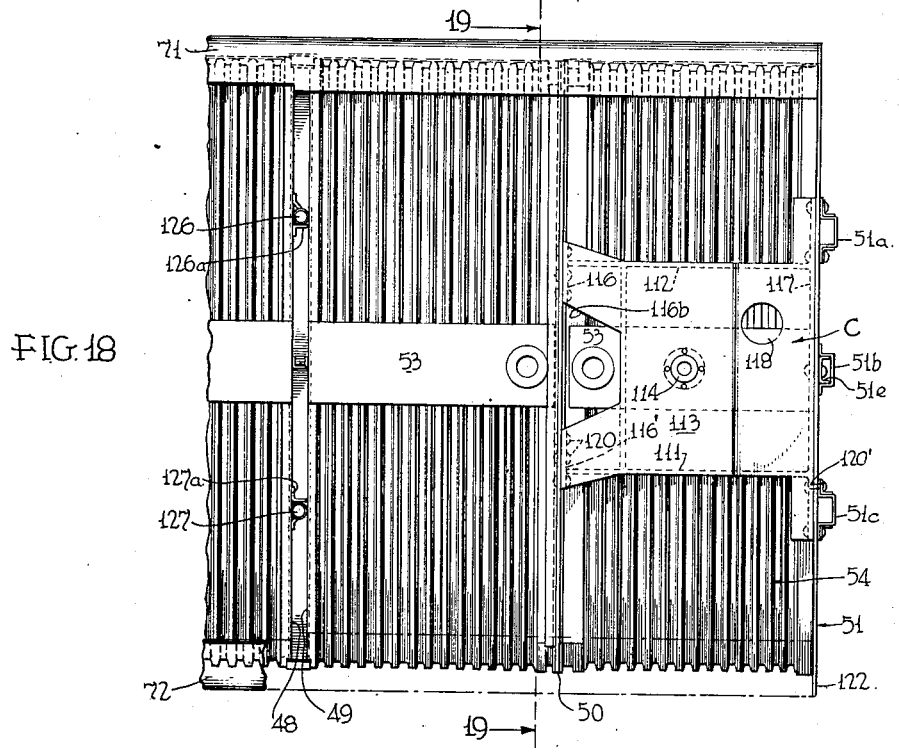
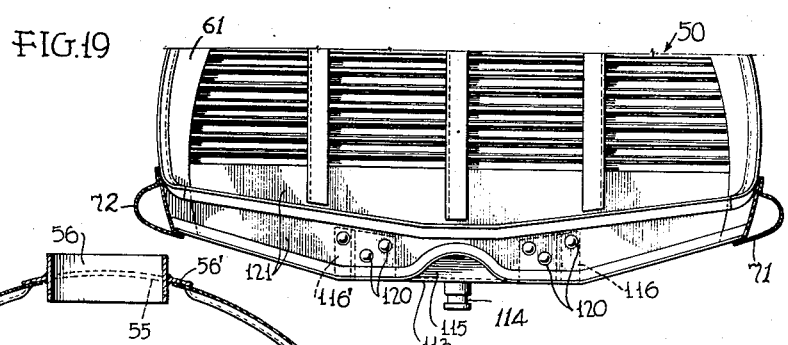
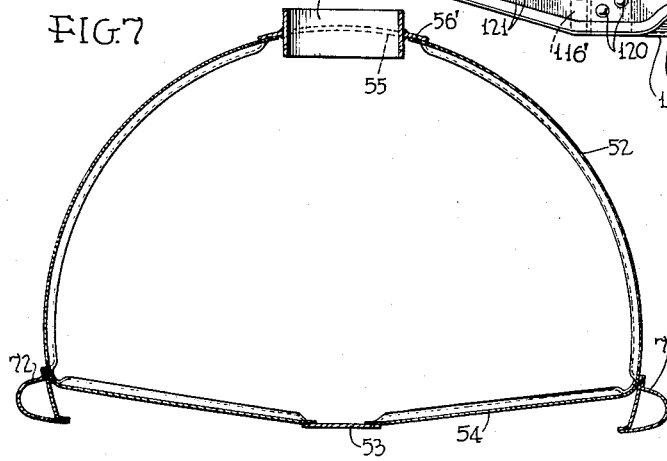
INVENTOR:
Raymond J. Theriault.
BY John P. Tarbox
ATTORNEY INVENTOR:
Raymond J. Theriault
BY John P. Varbo
ATTORNEY Patented Sept. 12, 1944

2,358,190

UNITED STATES PATENT OFFICE 2,358,190

STORAGE TANK, ESPECIALLY TANK TRAILER

Raymond J. Theriault, Philadelphia, Pa., assignor to Edward G. Budd Manufacturing Company, Philadelphia, Pa., a corporation of Pennsylvania Application June 3, 1940, Serial No. 338,587

8 Claims. (Cl. 280—5)

This invention relates in general to storage tanks, and more particularly to a trailer or semi-trailer tank car wherein novel features of design and construction are embodied.

The principal object of the invention is to provide a trailer tank car of exceptionally light weight, but of strong and rigid construction, and wherein the frame and the cross members or bulkheads reinforcing same are composed for the most part of corrugated sheet metal and coact to form compartments or reservoirs for the reception and dispensing of liquids.

Another object is to provide a trailer tank car wherein the customary comparatively heavy chassis or understructure is dispensed with and a substantial reduction in weight and material achieved by the substitution of a novel sheet metal frame incorporating sheet metal partitions which serve in conjunction therewith both as reinforcing cross members and as coacting bulkheads or baffles of reservoirs.

A further object is the provision of a trailer tank car having a novel, chassisless frame composed substantially of a light-weight, rustless ferrous alloy, and of a design affording an unusually low center of gravity and a relatively large carrying capacity.

A still further object is to provide a trailer tank car having a frame composed of a material unusually light in weight, such as corrugated sheet steel, which is braced and divided into a plurality of liquid-containing compartments by a series of stainless corrugated sheet steel bulkheads welded thereto.

Other objects and advantages residing in the novel design and construction will appear hereinafter and will be best understood by reference to the drawings wherein:

Fig. 2 is a vertical sectional view taken substantially on the longitudinal median line of the car, and with the tractor unit omitted;

Fig. 3 is an end elevational view of the car, as seen from the rear, and with the wheels and certain other details omitted;

Fig. 4 is an end elevational view of the car, as seen from the front, and with the tractor omitted, and showing the attachment of the landing gear to the adjacent tank compartment;

Fig. 5 is a longitudinal sectional view, taken on the line, and as viewed in the direction of the arrows 5—5 of Fig. 1;

Fig. 6 is a fragmentary, enlarged detail view, taken in the zone defined by the dot and dash lines of Fig. 5, and designated by the numeral 6, and showing the general mode of construction of the bulkheads and their attachment to the members composing the side frames or panels;

Fig. 7 is a transverse sectional view, taken on the line 7—7 of Fig. 1, and showing a typical construction of the side and bottom members of one of the liquid-containing compartments;

Figs. 8 to 13 inclusive are similar face views showing the design and construction of the bulkheads disclosed in Fig. 5, and indicated therein by corresponding reference numerals;

Fig. 14 is a perspective view, with portions broken away for clearer illustration, and showing the mode of fastening and the disposition of parts at the rear of the car, and the reinforced members and structure to which the wheel and spring assembly is connected;

Fig. 15 is a sectional view, taken on the line and as viewed in the direction of the arrows 15—15 of Figs. 2 and 3;

Fig. 16 is a transverse sectional view, partly in elevation, with portions broken away, taken on the line and as viewed in the direction of the arrows 16—16 of Fig. 2, and showing certain of the means by which the spring suspension and wheel assembly is operatively secured to the bulkheads;

Fig. 17 is a transverse sectional, detail view, taken on the line and as viewed in the direction of the arrows 17—17 of Fig. 2;

Fig. 18 is an enlarged, fragmentary bottom view of the front portion of the car, and showing the fifth wheel connection assembly and adjacent parts;

Fig. 19 is a fragmentary transverse sectional view, partly in elevation, taken on the line and as viewed in the direction of the arrows 19—19 of Fig. 18;

Fig. 20 is a perspective view of the truss assembly to which the fifth wheel is fastened;

Figure 1:
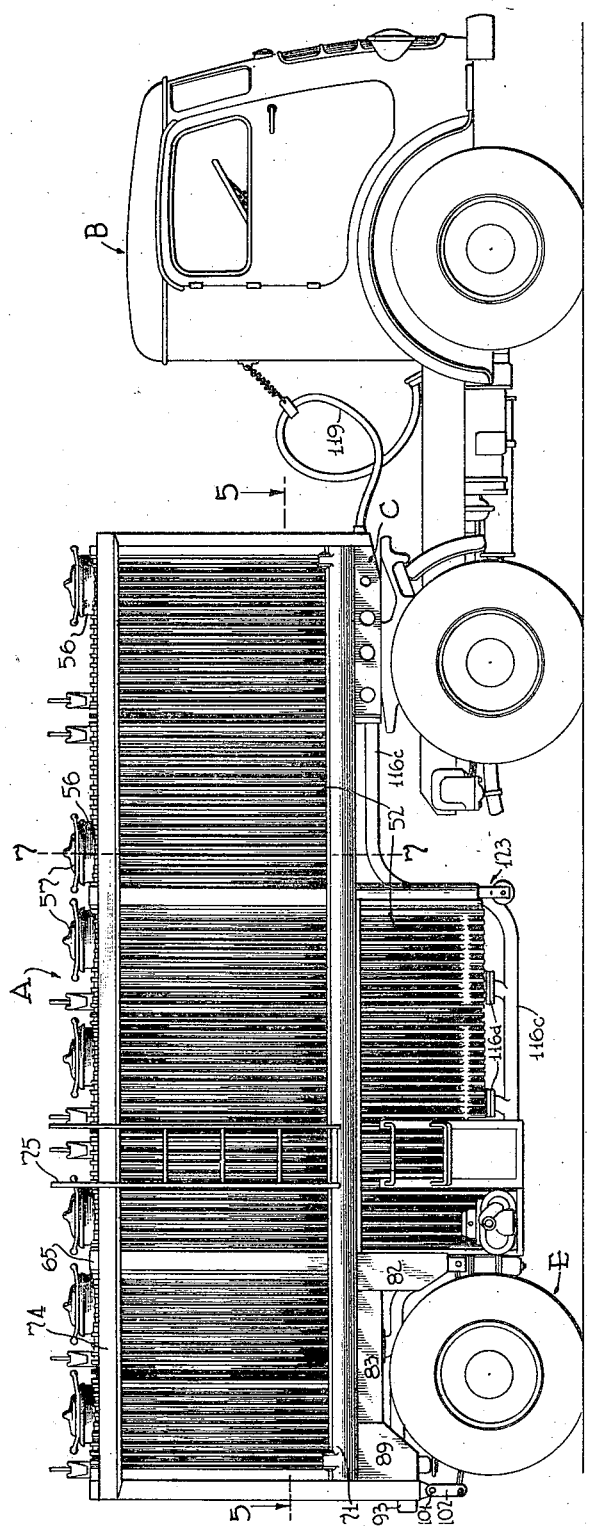
Fig. 1 is a side elevational view of a trailer tank car embodying the invention, with the tractor unit operatively connected thereto.

Fig. 21 is a fragmentary, transverse sectional view, taken on the line and as viewed in the direction of the arrows 21—21 of Fig. 2; and showing a construction characteristic of the upper portion of the bulkhead shown in Fig. 11; and Fig. 22 is a view similar to Fig. 21, taken on the line and as viewed in the direction of the arrows 22—22 of Fig. 2, and showing a construction typical of the upper portion of the bulkheads shown in Figs. 10 and 13.

Referring now to the drawings wherein similar characters of reference indicate corresponding parts in the several views of the preferred form of the invention, the letter A designates a trailer tank car embodying the invention, and B a tractor unit therefor. Since the tractor unit B may be of conventional design and construction and forming no part of the present invention, no reference to its construction will be made hereinafter.

Figure 14:
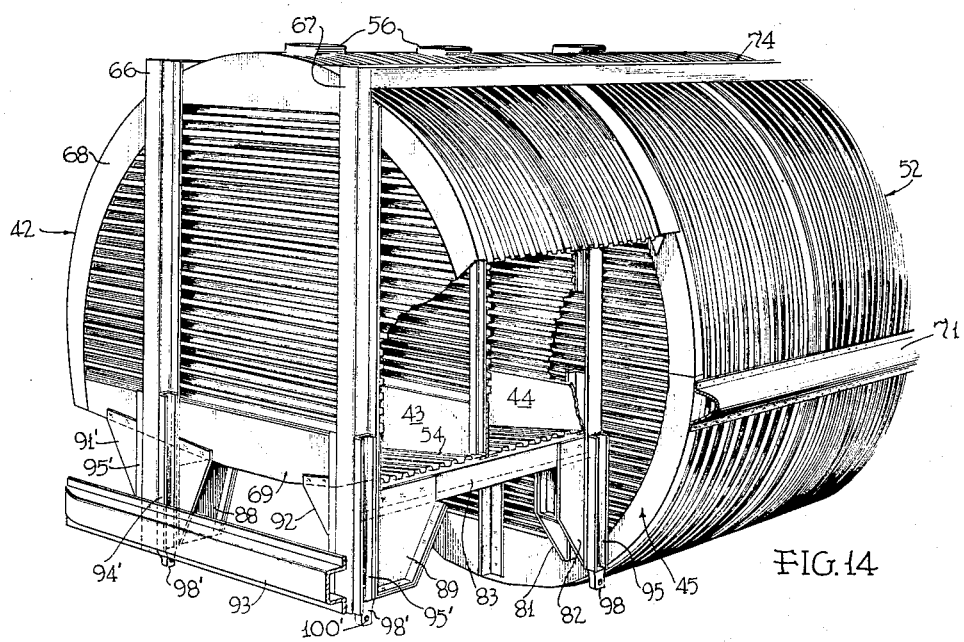

As clearly shown in Figs. 4 and 14, it will be observed that the body portion of the tank car A, in large measure, is substantially cylindrical and that the outer peripheries of the liquid-containing reservoirs coact to form the top, bottom and sides of the car.

As best shown in Figs. 2 and 5, it will be seen that the trailer tank car A comprises a series of seven compartments or reservoirs numbered respectively 35 to 41 and arranged in adjacent, joined relationship one to another. These compartments are formed or defined by a series of sheet metal partitions or bulkheads which, including the rear and front end walls or partitions, are numbered respectively as 42 to 51 inclusive.

The pairs of reservoirs or compartments 35, 36 and 40, 41 are of similar depth, although differing in length; and are arranged as pairs on either side of a group of three comparatively deep reservoirs or compartments 37, 38, 39 to the last-mentioned of which the landing gear, hereinafter referred to, is operatively secured. A fifth wheel supporting assembly or connection C, best shown in Figs. 2, 18 and 20, is secured to the bottom of the front reservoir 41, as set forth in ensuing paragraphs. As also described hereinafter, the spring suspension system and the rear wheel assembly, designated generally at D and E respectively, are operatively connected to means associated with the compartments 36, 37 and the rear compartment 35.

The details composing the various compartments or reservoirs and the means connected therewith which in combination form the trailer tank car of this invention will now be described.

By inspection and comparison of Figs. 5, 6 and 7, a general conception of the construction and mode of joining the series of corrugated sheet metal bulkheads and the adjacent sections of the corrugated sheet metal, arcuate frame or sheathing enclosing same to form therewith and in conjunction with certain auxiliary elements, the reservoirs alluded to above, will be obtained. This sheet metal frame, designated generally by the numeral 52, presents, in large measure, a substantially cylindrical configuration, as best shown in Figs. 11 and 13; and a somewhat truncated, cylindrical shape at its rear and front portions, as shown, for example, in Figs. 7, 8 and 9. In Fig. 7, it will be noted, the sheathing 52 is bent inwardly from both sides and extended into welded engagement with a centrally located base plate 53 to form a bottom 54, the upper edges of the sheathing being apertured, as at 55, to receive the manhole members, indicated generally at 56. Each of the series of manhole members 56 may have an annular flange 56′ which is welded to adjacent portions of the sheathing 52 and is further provided with a removable lid 57 (see Fig. 1) for the dispensing and replenishing of the contents of the several reservoirs.

The sheet metal frame or sheathing 52, which is composed of joined sections, as best shown in Fig. 6, has in the localities shown the opposite edges of its adjacent sections welded, as at 58, to arcuate or annular angle or channel members 59, 60. The angle member 59 is welded to the adjacent surface of the bulkhead 51, while the flanged channel member 60 is welded to a plate 61 which in turn is seam-welded to one of the faces of the bulkhead 50 and to a similar arcuate, flanged channel member 62.

The body portion of the bulkheads, which are more or less of similar construction, comprise a plate composed of corrugated sheet metal, preferably steel, and for greater convenience in manufacturing, are welded together from narrow strips, which latter are cut in such wise as to give the side edges of the assembled plate a step-like configuration, as at 42$^a$ (Fig. 9). The periphery of these bulkheads, including their side edges, as described more fully in ensuing paragraphs, have attached thereto arcuate members which may be of the angle and channel type and also plates, and which are of the same characteristic type as those mentioned in the preceding paragraph and illustrated in Fig. 6. In view of the similarity of certain of the bulkheads to others, only one face view of each characteristic bulkhead is shown. The double bulkheads 44, 45, for example, illustrated in Figs. 12 and 11, are substantially similar to the double bulkheads 48, 49. The bulkheads 46, 47 are also similar, as denoted, in Fig. 13, by the double reference numeral 46, 47; and the bulkheads 43 and 50, in most respects, are similar aside from the means employed for fastening the fifth wheel assembly C to the last-mentioned bulkhead.

It is to be understood that the series of reservoirs are built up, one at a time, each unit being added to the preceding one and fastened to it in liquid-tight condition by a process largely employing seam-welding. This building-up process may, of course, begin at either end, or if desired, with the fabrication of intermediate units. In the present instance, the construction may be assumed, for example, to have commenced with the front reservoirs 40 and 41, which latter include respectively the bulkheads 49 and 51, the intermediate bulkhead 50 being then inserted between the adjacent arcuate sheathing or sheet metal frames 62 and 60 referred to above.

The specific construction of the front bulkhead 51, which may be considered in most respects as typical of the other bulkheads, as best shown in Figs. 4 and 8, comprises a plurality of bracing and reinforcing channel bars 51$^a$, 51$^b$, 51$^c$ welded to the outer face of its corrugated sheet metal body portion 51$^d$ and riveted to the fifth wheel assembly C hereinafter described more fully. The three channel bars 51$^a$, 51$^b$, and 51$^c$ are also welded to the annular edge reinforcing member 59, the middle channel bar 51$^b$ being reinforced at its lower portion by a supplementary channel element 51$^e$ riveted thereto (Fig. 18) and to an adjacent portion of the fifth wheel assembly, as described more fully hereinafter.

The junction of the adjacent double bulkheads 48, 49 to the arcuate frame 52 is effected by similar angle members 63, 64 which are welded thereto and by an annular plate 65, it being noted that the said bulkheads 48, 49 have fastened to their opposed faces the vertically arranged angle bars 48$^a$, 48$^b$, 48$^c$ and 49$^a$, 49$^b$, and 49$^c$, respectively, similarly to their counterpart bulkhead members 44, 45. The free arms of oppositely arranged bars overlap and are connected with each other. By inspection and comparison of Figs. 8 to 13, inclusive, a general conception of the differences in design and construction of the several bulkheads may be obtained. The rear bulkhead 42, which heretofore has not been described, is braced across its face by two channel members 66, 67 whose flanges are welded to the adjacent corrugations of the body portion of the said bulkhead and also to the sides of the edge-reinforcing arcuate and diametral members 68, 69, respectively, which are also welded to and margin the body portion of the bulkhead.

The entire series of bulkheads 42 to 51, inclusive, are reinforced and stiffened collectively by longitudinally-extending chord members 71, 72 which are of channel construction (see Figs. 3, 7 and 14). These channel members, at the rear bulkhead 42 and the front bulkhead 51, are extended inwardly under the adjacent edge-reinforcing members of these bulkheads, and adjacent the reservoir 40 or illustrated as dependent from the lower portions of the latter. The same channel members 71, 72, in addition to their reinforcing and stiffening functions, also add to the general appearance of the tank car and, at their rear extremity, may serve as a receptacle for the accommodation of the hose nozzle (not shown) when the latter is not in use.

A walkway, indicated generally at 74, is provided on the top of the compartments or reservoirs and forms a strong upper chord member. It is made accessible by a ladder 75. In Fig. 21, this walkway is illustrated as being formed by the provision of two similar flanged members 74a, 74b whose flanges are fastened to angle bars or members 74c, 74d in turn fastened to adjacent upper portions of the elements composing the reservoirs in this vicinity and including the adjacent vertically arranged angle bars. In Fig. 22, the walkway 74 has its under surface seated directly on the top and somewhat flattened portion of the annular edge reinforcing member 46d of the bulkhead 46 which, similarly to the other bulkheads, is braced by three vertically arranged angle bars 46a, 46b, 46c welded to one of its faces.

The means employed for operatively connecting the spring suspension system D and the rear wheel assembly E to the trailer car A, or more particularly to certain of the bulkheads so that the entire car and its load may be supported on its springs and wheels through the intermediary of some of the bulkheads or elements forming same, forms another feature of this invention. These details are best shown in Figs. 2, and 14 to 17 inclusive, wherein the bulkheads 42 to 45 inclusive, with reinforcing members, now to be described, serve as the direct support of the car and load.

The bulkhead 45, which forms the rear wall of the elongated compartment 37, has a plurality of angle bars 76 to 80 inclusive welded to and arranged in spaced, vertical relation across one of its faces. Each of the angle bars 76, 77 and 79, 80 has welded thereto gusset plates 81, 82 to the upper inner sides of which one end of a brace bar or strut member, designated generally at 83, is welded. The strut 83, one of which it is understood is located on either side of the symmetrical chassis, in cross section (Fig. 16) has a box-like configuration, being formed of two longitudinally extending plates or straps 84, 85 joined in spaced relation by channel bars 86, 87. The opposite end of the strut 83 is similarly welded to and between gusset plates 88, 89 which in turn are welded to the inner walls of the channel members 66, 67, respectively, of the bulkhead 42. A second pair of gusset plates 91, 92 fastened to the outer side of the bulkhead 42 and to the channel members 66, 67, respectively, as to provide means for reinforcing the latter to the lower portions of which a bumper bar 93 is fastened.

Figure 15:
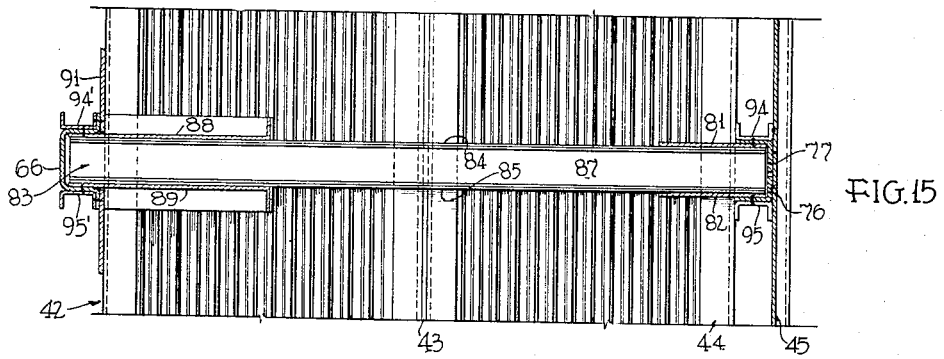
Figure 16:
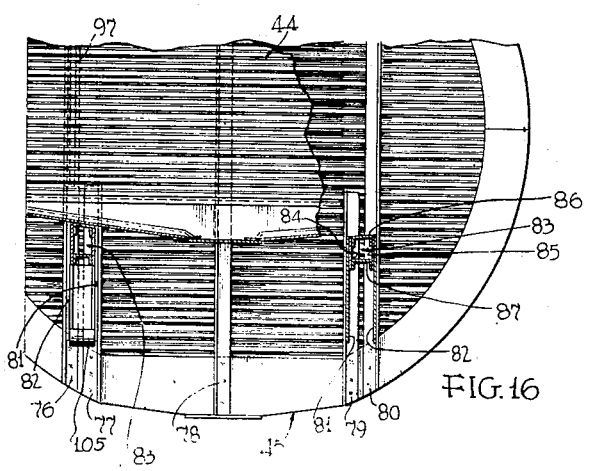
Figure 17:
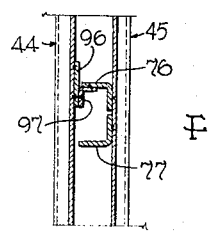

The inner end of each brace bar or strut 83 and the gusset plates 81, 82 are extended beneath the bulkhead 44 and into the space between the said bulkhead 44 and the adjacent bulkhead 45 where they are welded to the adjacent angle bars in the present instance, as illustrated, the angle bars 76, 77. These last-mentioned angle bars 76, 77 are welded to channel members 94, 95 in turn welded to the adjacent bulkhead 45, and similar channel members 94', 95' are welded to the side walls and flanges of the channel members 66, 67 of the rear end bulkhead 42 (Figs. 14, 15). By inspection of Fig. 17, it will be further observed that the upper portion of the space between the bulkheads 44, 45 accommodates means for joining together and stiffening the bulkheads 44, 45 and constitutes another feature of this invention, the said means including a vertically extending plate 96 fastened to the bulkhead 44 and having a comparatively small angle bar 97 welded to its inner surface, the angle bar 97 in turn being welded to the angle bar 76.

As best shown in Figs. 2 and 14, the channel members 66, 67 of the bulkhead 42, and the outer angle members 76, 80 of the bulkhead 45 have secured thereto the channel members 94, 95 and 94', 95' mentioned above, and are provided with lugs, as at 98 and 98'. The lugs 98' have a hole 100 adapted to receive shackle bolts 101 on which the spring shackle hanger links 102 are pivoted. The spring suspension system D, which is shown more or less diagrammatically, comprises, on either side of the car A, a compound or twin spring assembly 103, 103', the former of which has its ends connected to the spring shackle links 102 and the front lugs 98, respectively, while the latter 103' has its ends operatively engaged against abutment members 104, 105, as best shown in Fig. 2. The abutment members 104, 105, each of which is formed of a pair of channel members having their webs or back welded together as at 106, their lower ends rounded, and their upper portions welded to inner portions of the adjacent gusset plates 81, 82 and 88, 89.

The fifth wheel connection assembly C is essentially a truss-like member which may be a casting, but, as illustrated, is preferably an arc-welded structure, and is composed of sides 111, 112 arranged in spaced relation and having their bottom edges welded to or integral with a bottom plate 113 provided with a socket 114 which accommodates the customary king pin (not shown) by which the tractor unit B is operatively connected.

The sides 111, 112 of the assembly C are joined by a cross member or plate 115 and have their opposite ends integral with or welded to transversely arranged plates or members 116, 116' and 117 which are provided with suitable holes to accommodate the fastening means. The bottom plate of the assembly C is apertured, as at 118, to accommodate the usual cable 119 from the tractor unit B for the lighting and signal control of the trailer A, and is also cut away as at 116b to accommodate the manifold pipe 116c which communicates with the outlet of each of the reservoirs. These outlets are indicated generally at 116ᵈ.

The secure attachment of the assembly C to the adjacent bulkhead 50, 51 forms another structural feature of this invention. This is accomplished by riveting, at 120, the rear plates 118, 118' of the assembly to a depending portion of the lower part 121 of the annular member 61 welded to the bulkhead 50. The front plate 117 of the assembly C is riveted to a plate 122, which latter is secured by the same rivets 120' to the channel element 51ᵉ hereinbefore mentioned.

As disclosed in Figures 1, 2, 4 and 18, the landing gear 123 mentioned above is composed of a pair of rollers or casters secured to rods or members 124, 125 adjustably accommodated in tubular members 126, 127 fastened to angle members 126ᵃ, 127ᵃ welded to the bulkhead 48.

The circumferential sheathing members 52 are preferably roller-drawn from sheet metal strips such as cold rolled stainless steel. Where the strips available are not wide enough for one compartment, two or more strips are welded together preferably in partly overlapped relation by electric seam welding, proper care being taken that the seam becomes fluid tight.

Regarding the connection between the different members entering into the construction, it may additionally be remarked, that, wherever feasible, electric spot welding is employed and, if austenitic stainless steel is used, in such a well known manner that the properties of this material are not adversely affected. At the bulkhead 50 in Fig. 6 it is indicated that the connections for stress transmission are made by electric spot welds 128, 129 between the members 50, 51 and 60, 61, 62, respectively, and that fluid tightness is additionally insured by arc or gas welds 130 and 131. The same combined spot weld and deposit weld connections or seals may, of course, be used throughout the body where the joint has to be stress transmitting and fluid tight. Often electric resistance seam welding may serve alone the said double purpose.

By inspection of Figs. 1 and 2, it will be observed that the space between the rear wheels E of the trailer tank car A and the rear wheels of the tractor unit B is in large measure occupied by the comparatively deep reservoirs 37, 38 and 39 thus substantially lowering the center of gravity of the entire tank car, and also permitting an increased load-carrying capacity over conventional type trailer tank cars. In these latter, the space between the wheels of the tractor unit and the rear wheels of the tank trailer is not utilized for the storage of fuel, but rather for the accommodation of certain component parts of the underframe or chassis whereon their cylindrical type tanks are seated.

An important feature of the new tank car, although the invention is not necessarily restricted to it, consists in the double-bulkheads between certain adjacent compartments and especially between those compartments which differ considerably in cross-section. Whereas it would be a rather difficult problem to make a fluid tight and stress resisting connection between the circumferential wall of the compartments 36 or 40 and the bulkheads 45 or 48, respectively, of the compartments 37 and 39, such problem disappears by the use of the individual bulkheads 44 and 49 respectively for the compartments 36 and 40. Moreover, the space between two adjacent bulkheads allows the effective anchorage of spring supporting members or of the landing gear.

By reason of the novel design, exceptionally light weight, low center of gravity and the rustless character of the material composing the trailer tank car of this invention, important operating advantages are achieved in the way of a more economical fuel consumption, a more balanced construction, a greater load-carrying capacity and a frame highly resistant to tarnish and oxidation. Over comparatively long periods of operation, these features, it will be appreciated, will achieve a marked economy in operating expenses.

It is to be understood that the invention may be embodied in other specific forms without departing from the spirit or essential attributes thereof, and it is therefore desired the present embodiment be considered in all respects as illustrative and not restrictive, reference being had to the appended claims rather than to the foregoing description to indicate the scope of the invention; and it will be further understood that each and every novel feature and combination present in or possessed by the mechanism herein disclosed forms a part of the invention included in the application.

What is claimed is:

1. In a hollow section body such as a storage tank, a structure forming the circumferential wall of the body, a transverse wall structure, said transverse wall structure comprising a corrugated sheet-metal plate and a frame of web material, said transverse wall structure being arranged substantially in a plane transversely to said circumferential wall, the outer margin of said frame being connected to said circumferential wall structure, said frame surrounding an opening occupying the greater portion of the cross sectional area of said body in the region of said transverse wall structure, said opening being closed by said corrugated sheet metal plate, at least one elongated reinforcing member extending across said frame and transversely to the corrugations of said sheet metal plate, said reinforcing member having its ends fastened to said frame and its middle portion to said sheet metal plate, one end of said member extending beyond the general outlines of said frame and being adapted for the attachment of other members.

2. In a hollow section body such as a storage tank, a structure forming the circumferential wall of the body, a transverse wall structure, said transverse wall structure comprising a corrugated sheet metal plate and a frame of web material, said transverse wall structure being arranged substantially in a plane transversely to said circumferential wall of the body, the outer margin of said frame being connected to said circumferential wall structure, said frame surrounding an opening occupying the greater portion of the cross sectional area of said body in the region of said transverse wall structure, said opening being closed by said sheet metal plate, said frame having an integral part extending beyond its general outline, such extending part being adapted for the attachment and the support of another member.

3. In a tubular, horizontally arranged tank such as a vehicle tank, a sheet metal plate bent into the form of a nearly closed ring which ring corresponds to the cross sectional form of the tank, said ring-formed plate having circumferential corrugations and forming at least a portion of the outer wall of the tank, a comparatively narrow plate extending in the longitudinal direction of the tank, said longitudinal plate having its longitudinal margins rigidly connected to the ends of said ring-shaped plate so as to bridge the gap between those ends, said longitudinal plate being substantially straight in longitudinal direction and arranged near to the longitudinal vertical middle plane of the tank and at the underside of the latter, a walk-way structure near the top of the tank and extending in the longitudinal direction of the latter, said longitudinal plate and said walk-way structure being in the nature of load transmitting lower and upper chord structures.

4. A vehicle tank such as a chassisless trailer tank construction comprising, in combination, a structure forming the circumferential wall of the tank composed substantially of corrugated sheet metal and reinforced in spaced, operative relation by corrugated sheet metal bulkheads, means joining the bulkheads to the circumferential wall to form therewith a plurality of reservoirs, and other means extending at least partly across and being fastened to the faces of at least some of the bulkheads, said last-named means being adapted for operatively securing thereto a spring suspension system.

5. A vehicle tank such as a trailer tank of the chassisless type, comprising in combination, a sheathing composed substantially of sheet metal sections and having an arcuate configuration, a plurality of bulkheads composed of sheet metal and arranged in spaced relation within and secured to the said sheathing, and means extending at least partly across and being fastened to the faces of at least some of said bulkheads, said last-named means being adapted for operatively securing thereto a spring suspension system and a coacting wheel assembly.

6. In a vehicle tank such as a trailer tank, the combination of a sheet metal frame forming the outer shell of the tank, a plurality of sheet metal bulkheads arranged within the frame, means operatively joining the bulkheads and frame to form therewith a plurality of liquid-tight reservoirs, each reservoir of at least one pair of adjacent reservoirs having a bulkhead of its own where the two reservoirs meet so that a double-walled composite bulkhead is formed, means adapted for the attachment of a wheel suspension, said means overlapping and being secured to the walls of the double-walled bulkhead whereby the suspension system is connected to and supported by said double-walled bulkheads of said pair of reservoirs.

7. A vehicle tank car such as a trailer tank car construction including a sheet metal longitudinally extending shell, a plurality of sheet metal bulkheads arranged in spaced relation within the shell, means joining the bulkheads to the shell to form therewith a plurality of reservoirs, means adapted for operatively securing a wheel suspension system to certain of the bulkheads, at least one of the reservoirs being located substantially above the plane of securement of the suspension system, and at least one other of the reservoirs having a portion extending a substantial distance below the plane of securement of the suspension system, whereby the center of gravity of the tank car is appreciably lowered.

8. In a vehicle tank such as a trailer tank comprising a plurality of reservoirs, such reservoirs being formed by tubular members extending in the longitudinal direction of the vehicle and by transverse bulkheads, said reservoirs having separate end-bulkheads in the region where they meet each other, said separate end-bulkheads extending about parallel to and being spaced from each other, reinforcing members extending between and being connected to both such end-bulkheads, said reinforcing members forming parts of suspension means such as a spring suspension for road wheels or a landing gear.

RAYMOND J. THERIAULT.